(12) United States Patent
Lee et al.

(10) Patent No.: US 8,927,642 B2
(45) Date of Patent: Jan. 6, 2015

(54) THERMOPLASTIC RESIN COMPOSITION WITH ANTI-DRIPPING PROPERTIES

(71) Applicant: Cheil Industries Inc., Gum-si (KR)

(72) Inventors: Yun Tack Lee, Uiwang-si (KR); Sung Hee Ahn, Uiwang-si (KR); Seon Ae Lee, Uiwang-si (KR); Byeong Yeol Kim, Uiwang-si (KR); Won Jun Choi, Uiwang-si (KR); Seung Yong Bae, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/934,280

(22) Filed: Jul. 3, 2013

(65) Prior Publication Data

US 2014/0187702 A1    Jul. 3, 2014

(30) Foreign Application Priority Data

Dec. 27, 2012 (KR) .......... 10-2012-0154410

(51) Int. Cl.
*B60C 1/00* (2006.01)
*C08K 7/06* (2006.01)
*C08K 3/22* (2006.01)

(52) U.S. Cl.
CPC ............ *C08K 7/06* (2013.01); *C08K 3/2279* (2013.01)
USPC .......................................................... 524/495

(58) Field of Classification Search
USPC .......................................................... 524/495
See application file for complete search history.

(56) References Cited

U.S. PATENT DOCUMENTS

2006/0089434 A1* 4/2006 Nodera .......................... 524/115

FOREIGN PATENT DOCUMENTS

KR    2004-0059618 A    7/2004

* cited by examiner

*Primary Examiner* — Ling Choi
*Assistant Examiner* — Thuy-Ai Nguyen
(74) *Attorney, Agent, or Firm* — Additon, Higgins & Pendleton, P.A.

(57) ABSTRACT

A thermoplastic resin composition includes (A) thermoplastic resin in an amount of about 100 parts by weight, (B) flame retardant in an amount of about 1 to about 10 parts by weight, and (C) carbon nanotubes in an amount of about 0.005 to about 0.05 parts by weight. The thermoplastic resin composition of the present invention can have excellent anti-dripping properties.

10 Claims, No Drawings

THERMOPLASTIC RESIN COMPOSITION WITH ANTI-DRIPPING PROPERTIES

CROSS-REFERENCE TO RELATED APPLICATION

This application claims priority under 35 USC Section 119 to and the benefit of Korean Patent Application No. 10-2012-0154410, filed Dec. 27, 2012, the entire disclosure of which is incorporated herein by reference.

FIELD OF THE INVENTION

The present invention relates to a thermoplastic resin composition that can have anti-dripping properties.

BACKGROUND OF THE INVENTION

Worldwide, countries have implemented regulations requiring that resin compositions used in office automation devices and electric or electronic goods meet strict safety standards, including flame retardancy requirements. In addition, as a marketing tool, home appliances suppliers are further strengthening the flame retardant property as an internal regulation and many require their products to have a flame retardancy of UL (underwriters' Laboratories) 94 V-0.

Flame retardant can be added to a resin composition to give flame resistance. Examples of flame retardants include halogen-containing compounds, phosphorus-containing compounds, sulfonic acid metal salt compounds, silicon compounds, and the like.

Flame retardants can be effective in preventing combustion of the thermoplastic resin. Once the resin begins burning, however, it can be difficult to prevent dripping after it is in a liquid phase.

Anti-dripping agents can be added to prevent dripping of the melted resin during combustion. Fluorinated resins can be used as an anti-dripping agent.

Korean Patent No. 2004-0059618 discloses a method for preventing dripping of a resin by restricting the flow of the resin, and by increasing the shrinkage rate of the resin during burning by forming a fibrillar network inside the resin composition using a fluorinated polyolefin resin. However, if the fluorinated polyolefin resin forming a fibrillar network is used as an anti-dripping agent, pitting or silver streaks can be formed on the surface of injection molding product. In addition, this anti-dripping agent is typically used in more than a specific amount, which can impair the flame retardancy of the final resin product.

SUMMARY OF THE INVENTION

The inventors of the present invention have developed a thermoplastic resin composition to prevent resin dripping during burning, without using fluorinated polyolefin resin. The present invention accordingly provides a thermoplastic resin composition that can have excellent anti-dripping properties. The thermoplastic resin composition can also have excellent flame resistance and/or electrical conductivity. The thermoplastic resin composition of the invention can have excellent anti-dripping properties by including minute (small) quantities of carbon nanotubes.

A thermoplastic resin composition according to the present invention comprises (A) thermoplastic resin in an amount of about 100 parts by weight, (B) flame retardant in an amount of about 1 to about 10 parts by weight, and (C) carbon nanotubes in an amount of about 0.005 to about 0.05 parts by weight.

Examples of the thermoplastic resin (A) include without limitation acrylonitrile-butadiene-styrene copolymer resin (ABS resin), rubber modified polystyrene resin (HIPS), acrylonitrile-styrene-acrylate copolymer resin (ASA resin), methylmethacrylate-butadiene-styrene copolymer resin (MBS resin), acrylonitrile-ethylacrylate-styrene copolymer resin (AES resin), polycarbonate resin (PC), polyethylene (PE), polypropylene (PP), polyethylene terephthalate (PET), polybutylene terephthalate (PBT), polyvinylchloride (PVC), polymethyl methacrylate (PMMA), copolymers thereof, and the like and combinations thereof.

Examples of the flame retardant (B) can include without limitation halogen compounds, phosphorus compounds, antimony compounds, and the like and combinations thereof.

The carbon nanotubes (C) can be used as an anti-dripping agent. Examples of the carbon nanotubes (C) can include without limitation single-walled carbon nanotubes, double-walled carbon nanotubes, multi-walled carbon nanotubes, and the like and combinations thereof.

The average diameter of the carbon nanotubes (C) can be about 3 to about 100 nm, the length of the carbon nanotubes (C) can be about 50 to about 500 µm, and the aspect ratio (L/D) of the carbon nanotubes (C) can be about 80,000 to about 180,000.

The thermoplastic resin can further include one or more additives. Examples of the additives can include without limitation UV stabilizers, lubricants, releasing agents, nucleating agents, antistatic agents, stabilizers, reinforcing agents, inorganic additives, pigments, dyes, and the like, and combinations thereof.

A molded article prepared according to the present invention can be prepared from a thermoplastic resin composition that can have excellent anti-dripping properties.

The thermoplastic resin composition according to the present invention can exhibit excellent dripping prevention and flame resistance (flame retardancy) properties.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to a thermoplastic resin composition that can have excellent anti-dripping properties and flame resistance, and the present invention also relates to a thermoplastic resin composition comprising minute amounts of carbon nanotubes.

The thermoplastic resin composition according to the present invention comprises (A) thermoplastic resin, (B) flame retardant, and (C) carbon nanotubes.

Thermoplastic Resin Composition (A) Thermoplastic Resin

There is no specified limit to the thermoplastic resins which are used as a base resin in the present invention. Examples of the thermoplastic resin can include without limitation polyacrylonitrile-butadiene-styrene copolymer resins (ABS), rubber modified polystyrene resins (HIPS), acrylonitrile-styrene-acrylate copolymer resins (ASA), methyl methacrylate-butadiene-styrene copolymer resins (MBS), acrylonitrile-ethylacrylate-styrene copolymer resins (AES), polycarbonate resins (PC), polyolefin resins such as polyethylenes (PE), polypropylenes (PP), and the like, polyester resins such as polyethylene terephthalate (PET), polybutylene terephthalate (PBT), and the like, polyvinylchloride (PVC), polymethyl methacrylates (PMMA), polyamide resins (PA), copolymer thereofs, and the like and combinations thereof. In exemplary embodiments, the thermoplastic resin can include a rubber containing aromatic vinyl graft copolymer resin including (a1) an aromatic vinyl graft copolymer resin and (a2) an aromatic vinyl copolymer resin, such as an acrylonitrile-butadiene-styrene copolymer (ABS).

Acrylonitrile-butadiene-styrene copolymer (ABS) can include (a1') styrene-acrylonitrile containing graft copolymer resin and (a2') styrene-acrylonitrile containing copolymer resin.

(a1) Aromatic vinyl graft copolymer resin

Aromatic vinyl graft copolymer resin (a1) can be obtained by graft polymerization of an aromatic vinyl monomer and a monomer which can be copolymerized with the aromatic vinyl monomer on a rubber polymer. If necessary, a monomer which provides processability and heat resistance optionally can be further included.

Examples of the rubber polymer can include, without limitation, diene rubbers such as polybutadiene, poly(styrene-butadiene), poly(acrylonitrile-butandiene) and the like; saturated rubbers produced by adding hydrogen to the diene rubbers; isoprene rubbers; acrylic rubbers such as poly(butyl acrylate); ethylene-propylene-diene (EPDM) terpolymers; and the like, and combinations thereof. In exemplary embodiments, diene rubber can be used, for example butadiene rubber.

The aromatic vinyl graft copolymer resin (a1) can include the rubber polymer in an amount of about 5 to about 65% by weight, for example about 10 to about 60% by weight, and as another example about 20 to about 50% by weight, based on the total weight (100% by weight) of the aromatic vinyl graft copolymer resin (a1). In some embodiments, the aromatic vinyl graft copolymer resin may include the rubber polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65% by weight. Further, according to some embodiments of the present invention, the amount of the rubber polymer can be in a range from about any of the foregoing amounts to about any other of the foregoing amounts.

When the aromatic vinyl graft copolymer resin (a1) includes the rubber polymer in an amount within the above range, the resin can have excellent impact strength and mechanical properties.

The average particle size of the rubber polymer (rubber particles; Z-average) can range from about 0.05 to about 6 µm, for example about 0.15 to about 4 µm, and as another example about 0.25 to about 3.5 µm. In some embodiments, the rubber polymer may have an average rubber particle size of about 0.05, 0.06, 0.07, 0.08, 0.09, 0.1, 0.2, 0.3, 0.4, 0.5, 0.6, 0.7, 0.8, 0.9, 1, 2, 3, 4, 5, or 6 µm. Further, according to some embodiments of the present invention, the average rubber particle size of the rubber polymer can be in a range from about any of the foregoing to about any other of the foregoing. Within the range, the impact strength and the appearance of the resin can be excellent.

The aromatic vinyl monomer can be graft copolymerized on the rubber (co)polymer. Examples of the aromatic vinyl monomer can include, without limitation, styrene, α-methylstyrene, β-methylstyrene, p-methylstyrene, para t-butylstyrene, ethylstyrene, vinylxylene, monochlorostyrene, dichlorostyrene, dibromostyrene, vinylnaphthalene, and the like, and combination thereof. In exemplary embodiments, styrene can be used.

The aromatic vinyl graft copolymer resin (a1) can include the aromatic vinyl monomer in an amount of about 15 to about 94% by weight, for example about 20 to about 80% by weight, and as another example about 30 to about 60% by weight, based on the total weight (100% by weight) of the aromatic vinyl graft copolymer resin (a1). In some embodiments, the aromatic vinyl graft copolymer resin (a1) can include the aromatic vinyl monomer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94% by weight. Further, according to some embodiments of the present invention, the amount of the aromatic vinyl monomer can be in a range from about any of the foregoing amounts to about any other of the foregoing amounts.

When the aromatic vinyl graft copolymer resin (a1) includes the aromatic vinyl monomer in an amount within the above range, the resin can have excellent impact strength and mechanical properties.

Examples of the monomer which can be copolymerized with the aromatic vinyl monomer can include without limitation unsaturated nitrile compounds such as acrylonitrile, ethacrylonitrile, methacrylonitrile, and the like. These compounds can be used singly or as a combination of two or more.

The aromatic vinyl graft copolymer resin (a1) can include the monomer which can be copolymerized with the aromatic vinyl monomer in an amount of about 1 to about 50% by weight, for example about 5 to about 45% by weight, and as another example about 10 to about 30% by weight, based on the total weight (100% by weight) of the graft copolymer (a1). In some embodiments, the aromatic vinyl graft copolymer resin (a1) can include the monomer which can be copolymerized with the aromatic vinyl monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the monomer which can be copolymerized with the aromatic vinyl monomer can be in a range from about any of the foregoing amounts to about any other of the foregoing amounts.

When the aromatic vinyl graft copolymer resin (a1) includes the monomer which can be copolymerized with the aromatic vinyl monomer in an amount within the above range, the resin can have excellent impact strength and mechanical properties.

Examples of the monomer that can provide processability and heat resistance can include, without limitation, acrylic acid, methacrylic acid, maleic anhydride, N-substituted maleimides, and the like and combinations thereof.

The aromatic vinyl graft copolymer resin (a1) can include the monomer that provides processability and heat resistance in an amount of about 0 to about 15% by weight, for example about 0.1 to about 10% by weight, based on the total weight (100% by weight) of the graft copolymer resin (a1). In some embodiments, the aromatic vinyl graft copolymer resin can include the monomer that provides processability and heat resistance in an amount of 0 (the monomer is not present), about 0 (the monomer is present), 1, 2, 3, 4, 5, 6, 7, 8, 9, 10, 11, 12, 13, 14, or 15% by weight. Further, according to some embodiments of the present invention, the amount of the monomer that provides processability and heat resistance can be in a range from about any of the foregoing amounts to about any other of the foregoing amounts.

When the aromatic vinyl graft copolymer resin (a1) includes the monomer that provides processability and heat resistance in an amount within the above range, processability and heat resistance can be obtained without hampering other properties of the resin.

(a2) Aromatic Vinyl Copolymer Resin

The aromatic vinyl copolymer resin can be prepared by using a monomer mixture, except rubber (rubber polymer) as described herein for the graft copolymer resin (a1). The ratio of monomers can be different depending on factors such as compatibility, and the like. For example, the copolymer resin (a2) can be obtained by copolymerization of the aromatic vinyl monomer and the monomers which can be copolymerized with the aromatic vinyl monomer.

Examples of the aromatic vinyl monomer can include, without limitation, styrene, α-methylstyrene, β-methylstyrene, p-methylstyrene, para t-butylstyrene, ethylstyrene, vinylxylene, monochlorostyrene, dichlorostyrene, dibromostyrene, vinylstyrene, and the like, and combinations thereof. In exemplary embodiments, styrene can be used.

Also, examples of the monomer which can be copolymerized with the aromatic vinyl monomer can include without limitation unsaturated nitrile compounds such as acrylonitrile, ethacrylonitrile, methacrylonitrile, and the like. These can be used alone or as a mixture.

The copolymer resin (a2) can further include, if necessary, a monomer which provides processability and heat resistance. Examples of the monomer that provides processability and heat resistance can include, without limitation, acrylic acid, methacrylic acid, maleic anhydride, N-substituted maleimides, and the like, and combinations thereof.

The aromatic vinyl copolymer resin (a2) can include the aromatic vinyl monomer in an amount of about 50 to about 95% by weight, for example about 60 to about 90% by weight, and as another example about 70 to about 80% by weight, based on the total weight (100% by weight) of the aromatic vinyl copolymer resin (a2). In some embodiments, the aromatic vinyl copolymer resin (a2) can include the aromatic vinyl monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the aromatic vinyl monomer can be in a range from about any of the foregoing amounts to about any other of the foregoing amounts.

When the aromatic vinyl copolymer resin (a2) includes the aromatic vinyl monomer in an amount within the above range, the resin can have excellent impact strength and mechanical properties.

The aromatic vinyl copolymer resin (a2) can include the monomer which can be copolymerized with the aromatic vinyl monomer in an amount of about 5 to about 50% by weight, for example about 10 to about 40% by weight, and as another example about 20 to about 30% by weight, based on the total weight (100% by weight) of the copolymer resin (a2). In some embodiments, the aromatic vinyl copolymer resin (a2) can include the monomer which can be copolymerized with the aromatic vinyl monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the monomer which can be copolymerized with the aromatic vinyl monomer can be in a range from about any of the foregoing amounts to about any other of the foregoing amounts.

When the aromatic vinyl copolymer resin (a2) includes the monomer which can be copolymerized with the aromatic vinyl monomer in an amount within the above range, the resin can have excellent impact strength and mechanical properties.

The aromatic vinyl copolymer resin (a2) can include the monomer that can provide processability and heat resistance in an amount of about 0 to about 30% by weight, for example about 0.1 to about 20% by weight, based on the total weight (100% by weight) of the copolymer resin (a2). In some embodiments, the aromatic vinyl copolymer resin (a2) can include the monomer that provides processability and heat resistance in an amount of 0 (the monomer is not present), about 0 (the monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the amount of the monomer that provides processability and heat resistance can be in a range from about any of the foregoing amounts to about any other of the foregoing amounts.

When the aromatic vinyl copolymer resin (a2) includes the monomer that can provide processability and heat resistance in an amount within the above range, the resin can have excellent impact strength and mechanical properties without hampering other properties of the resin.

The weight average molecular weight of the copolymer (a2) can be about 50,000 to about 500,000 g/mol, but not limited to this range.

The methods of preparing these copolymer resins are well known to the person having a common knowledge in this field. Any of the methods such as but not limited to emulsion polymerization, suspension polymerization, solution polymerization, and/or mass polymerization can be used.

(B) Flame Retardants

Examples of the flame retardant (B) can include without limitation halogen compounds, phosphorus compounds, antimony compounds, and the like, and combinations thereof.

Halogen Compound

There is no particular limit on the types of halogen compounds which can be used as a flame retardant in the present invention. Exemplary halogen flame retardants that can be used in the invention include bromine compounds and/or chlorine compounds. Halogen flame retardant compounds that can be used in the invention are known in the art and are commercially available.

Examples of the halogen compounds can include without limitation decabromo diphenyl ethane, decabromo diphenyl ether, tetrabromo bisphenol-A, tetrabromo bisphenol-A epoxy oligomer, octabromo trimethylphenyl indane, ethylene-bis-tetrabomophthalimide, tris(tribromophenol)triazine, bromide polystyrene, decabromo diphenyl oxide, and the like, and combinations thereof.

A halogen compound which can be melted at normal processing temperatures can be used, for example a halogen compound having a melting point or softening point of about 250° C. can be used.

The flame retardant can include the halogen compound in an amount of about 50% by weight or more, for example about 50 to about 90% by weight. In some embodiments, the flame retardant can include the halogen compound in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the halogen compound can be in a range from about any of the foregoing amounts to about any other of the foregoing amounts.

Phosphorous Compound

Examples of the phosphorous compounds which can be used as flame retardants according to the present invention can include, without limitation, phosphate ester compounds, phosphoamidate compounds, oxaphosphorane compounds, carboxy phosphinic acid compounds, phosphate ester morpholide compounds, phosphagen compounds, and the like. These can be used alone or in combination. Phosphorous flame retardant compounds that can be used in the invention are known in the art and are commercially available.

Antimony Compounds

Antimony compounds can be added to provide adequate flame retardancy to the flame retardant thermoplastic resin composition. Examples of the antimony compounds, can include without limitation antimony trioxide, antimony pentaoxide, and the like, and combinations thereof. In exemplary embodiments, antimony trioxide can be used.

If antimony trioxide is used, the particle size can be about 0.01 to about 6.0 μm, for example about 0.02 to about 0.5 μm.

The flame retardant (B) which includes halogen compounds, phosphorus compounds, antimony compounds, or a combination thereof according to the present invention can be used in an amount of about 1 to about 10 parts by weight, based on about 100 parts by weight of the thermoplastic resin (A). In some embodiments, the thermoplastic resin composition can include the flame retardant (B) in an amount of about 1, 2, 3, 4, 5, 6, 7, 8, 9, or 10 parts by weight. Further, according to some embodiments of the present invention, the amount of the flame retardant can be in a range from about any of the foregoing amounts to about any other of the foregoing amounts If the amount of the flame retardant is less than about 1 part by weight, the composition may not have sufficient flame retardancy. If the amount of the flame retardant is greater than about 10 parts by weight, then physical properties of the resin composition such as colorability and thermo-stability during injection molding can be impaired.

(C) Carbon Nanotubes

The carbon nanotubes can have a very low electric resistance due to their structural characteristics and a very long form. These carbon nanotubes are used as an anti-dripping agent in the present invention.

The synthesis method used to make the carbon nanotubes is not limited. Conventional methods such as but not limited to arc-discharge, pyrolysis, laser ablation, plasma chemical vapor deposition, thermal chemical vapor deposition, electrolysis, and the like, can be use.

In the present invention, the carbon nanotubes can include single-walled carbon nanotubes (SWCNT), double-walled carbon nanotubes (DWCNT), multi-walled carbon nanotubes (MWCNT), rope carbon nanotubes, and the like, and combinations thereof. In exemplary embodiments, multi-walled carbon nanotubes (MWCNT) can be used.

The average diameter of the carbon nanotubes used in the present invention can be about 3 to about 100 nm, and the length can be about 50 to about 500 μm.

The carbon nanotubes can have an aspect ratio (L/D) of about 80,000 to about 180,000.

Generally carbon nanotubes display a straight line. However, considering handling and transportation during synthesis, the carbon nanotubes can be in a sphere-shaped agglomerate form with B.D. (bulk density) of about 0.1 to about 0.5 g/mL.

The carbon nanotubes can be included in an amount of about 0.005 to about 0.05 parts by weight, for example about 0.075 to about 0.02 parts by weight, based on about 100 parts by weight of the thermoplastic resin (A). In some embodiments, the thermoplastic resin composition can include the carbon nanotubes in an amount of about 0.005, 0.006, 0.007, 0.008, 0.009, 0.01, 0.02, 0.03, 0.4, or 0.05 parts by weight. Further, according to some embodiments of the present invention, the amount of the carbon nanotubes can be in a range from about any of the foregoing amounts to about any other of the foregoing amounts.

If the carbon nanotubes are included in an amount less than about 0.005 parts by weight, the bond between the carbon nanotubes and thermoplastic resin can become weak, and dripping can occur. If the carbon nanotubes are included in an amount greater than about 0.05 parts by weight, due to a thermal effect of the carbon nanotubes, a flame can remain during flame retardancy evaluations, resulting in reduction of flame retardant property.

(D) Additives

The thermoplastic resin composition in the present invention can further include one or more additives (D) as per the usage. Examples of the additives can include without limitation UV stabilizers, lubricants, releasing agents, nucleating agents, anti-static agents, stabilizers, reinforcing materials, inorganic addictives, colorants such as pigments and/or dyes, and the like, and combinations thereof.

UV stabilizers play the role of restricting color changes and reduction in light reflection of the resin composition caused by UV irradiation. Examples of the UV stabilizers can include without limitation benzotriazole-based UV stabilizers, benzophenone-based UV stabilizers, triazine-based UV stabilizers, and the like, and combinations thereof.

Examples of antioxidants can include without limitation phenols, phosphites, thioethers, amines, and the like, and combinations thereof.

Examples of colorants can include without limitation titanium dioxide, carbon black, and the like, and combinations thereof. Examples of the carbon black can include without limitation graphitized carbon, furnace black, acetylene black, Ketjen black, and the like, and combinations thereof.

The additives in the present invention can be included in an amount of about 1 to about 20 parts by weight, based on about 100 parts by weight of the thermoplastic resin (A).

The thermoplastic resin composition according to the present invention can be prepared by conventional methods of preparing resin compositions. For example, the composition components described herein and optional additives can be mixed together at the same time, melted and extruded using a conventional extruder into the form of pellets or chips.

Molded Articles

The present invention also provides a molded article prepared from the thermoplastic resin composition. There is no specific restriction in the methods for the preparation of the molded article. Examples of methods that can be used to make the molded articles includes without limitation extrusion molding, injection molding, and casting method. Molding techniques can be easily executed by a person of ordinary skill in the field to which this invention relates.

The molded article can have an Izod impact strength of about 20 to about 25 kgf·cm/cm, wherein the Izod notch impact strength is measured using a specimen with ⅛ inch thickness in accordance with ASTM D256 and ISO 180. For example, the Izod notch impact strength of the specimen having a thickness of ⅛ inch measured in accordance with ASTM D256 and ISO 180 can be about 21.6 kgf·cm/cm, about 20.5 kgf·cm/cm, or about 21.3 kgf·cm/cm.

The UL 94 rating of the molded article in the present invention measured in accordance with UL 94V can be higher than V-O.

The molded article can have a flexural strength of about 630 to about 660 kgf/cm², wherein the flexural strength is measured in accordance with ASTM D638 and ISO 527. For example, the flexural strength of the molded article measured in accordance with ASTM D638 and ISO 527 can be about 640 kgf/cm² or about 650 kgf/cm².

The molded article can have a flexural modulus of about 23,000 to about 25,000 kgf/cm², wherein the flexural modulus is measured in accordance with ASTM D790 and ISO 178. For example, the flexural modulus of the molded article measured in accordance with ASTM D790 and ISO 178 can be about 24,400 kgf/cm², about 23,900 kgf/cm², or about 24,200 kgf/cm².

The molded article can have a Vicat softening temperature (Vicat) of about 80 to about 90° C., wherein the Vicat softening temperature is measured under 5 kg load in accordance with ASTM D1525 and ISO R-306B. For example, the Vicat softening temperature for the molded article measured under a 5 kg load in accordance with ASTM D 1525 can be about 87.4° C., about 87.3° C., about 87.5° C., or about 87.6° C.

The molded article of the present invention can have excellent anti-dripping property since there can be minimal or no dripping.

The present invention can be more easily understood by the examples given below. These examples are for exemplifying the present invention and are not intended to limit the scope of the present invention.

EXAMPLES AND COMPARATIVE EXAMPLES

Each component which is used in examples and comparative examples is as follows.

(A) Thermoplastic Resin

The resin is prepared by mixing (a1) a styrene graft copolymer in an amount of 40% by weight and (a2) a styrene containing copolymer resin in an amount of 60% by weight.

(a1) Styrene Graft Copolymer Resin (ABS Graft Copolymer Resin)

After input of butadiene rubber latex as a solid component in an amount of 50 parts by weight into a reactor, styrene in an amount of 36 parts by weight, acrylonitrile in an amount of 14 parts by weight, and deionized water in an amount of 150 parts by weight are added, and potassium oleate in an amount of 1.0 parts by weight, cumene hydroperoxide in an amount of 0.4 parts by weight, mercaptan chain-transfer agent in an amount of 0.2 parts by weight, glucose in an amount of 0.4 parts by weight, iron sulfate hydrate in an amount of 0.01 parts by weight, and pyrophosphate sodium salt in an amount of 0.3 parts by weight, based on total solid component are additionally added. The mixture is reacted at 75° C. for 5 hours to the prepare graft copolymer resin latex. 0.4 parts by weight of sulfuric acid is added to the prepared latex to solidify and to prepare a styrene graft copolymer resin in powder form.

(a2) Styrene Containing Copolymer Resin (SAN Copolymer Resin)

In the reactor, styrene in an amount of 72 parts by weight, acrylonitrile in an amount of 28 parts by weight, deionized water in an amount of 120 parts by weight, azo bis-isobutyronitrile in an amount of 0.2 parts by weight, tricalcium phosphate in an amount of 0.4 parts by weight, and mercaptan chain-transfer agent in an amount of 0.2 parts by weight are added, and the reactor is heated up from room temperature to 80° C. for 90 min. This temperature is maintained for 240 min to prepare styrene-acrylonitrile copolymer resin (SAN) containing acrylonitrile in an amount of 25% by weight. This SAN is washed, dehydrated, and dried to prepare styrene containing the copolymer resin in powdered form. The weight average molecular weight of the styrene containing copolymer is 180,000 to 200,000 g/mol.

(B) Flame Retardant
Antimony trioxide (flame retardant)
(C) Carbon Nanotubes
(C-1) Average diameter 10 nm, length 100 to 300 μm
(C-2) Average diameter 10 nm, length 10 μm
(D) Additives
Teflon: AFLON PTFE G163 (ASAHI GLASS FLUOROP)

Examples 1 to 3 and Comparative Examples 1 to 7

Each component is added in the amounts indicated in Table 1 below and the mixture is melted and mixed in a twin extruder at 200 to 250° C. to prepare a resin composition in chip form. The chips so obtained are dried at 100° C. for longer than six hours and then specimens are prepared using a heated screw type injection molding machine at 190 to 220° C. The physical properties given below are evaluated for the prepared specimens and the results are set forth in Table 1.

Physical Property Measurement Methods (1) UL rating 94: UL94V is measured as follows. The specimens are made to stand vertically and a fire is lit on the specimens by using a burner. The flame should extinguish by itself within a specified time. According to the fire extinguishing degree, flame retardancy is categorized as V-2, V-1, V-0, and 5V.

1) Size of the specimen: length 5 inch (127 mm), width 0.5 inch (12.7 mm), thickness ½, ¼, ⅛, 1/16, 1/32 inch, and the like.

2) Pretreatment: The specimen is left at 23±2° C., relative humidity at 50±5 for 48 hours before carrying out the test.

3) Others: The minimum number of specimens used for the test is five and these five specimens constitute one testing set.

(2) Total combustion time: The specimens are fixed into the system and a fire is lit for 10 seconds with a burner. After removing the burner, the time till the fire is extinguished, that is the specimen burning time, should not exceed 10 seconds. The same test should be executed for one set having five specimens. The sum of the combustion time from each specimen becomes the total combustion time for one set of specimen. The total combustion time should not exceed 50 seconds. During this time, cotton which is placed below the specimen at around 30 cm should not be lit by dropped flame during burning of the specimen. If even a single specimen cannot qualify the requirement, same test should be executed for another one set of specimen. In this case, the total combustion time should be within 51 to 55 seconds.

(3) Vicat softening temperature (° C.): The Vicat softening temperature is measured under a 5 kg load in accordance with ASTM D1525 and ISO R-306B.

(4) Heat deflection temperature (HDT): After adding a load of 18.6 kgf/cm² on the specimen, the specimen is immersed into oil and preheated for 3 to 5 min. Oil is then heated with a heating speed of 120° C./hr. As oil temperature increases, the specimen sags. The temperature when the specimen sags by 0.254 mm is measured.

(5) Impact strength (Izod impact, kgf·cm/cm): Izod notch impact strength is measured for the specimen having thickness of ⅛ inch in accordance with ASTM D 256 and ISO 180.

(6) Flexural strength (kgf/cm²): The flexural strength of the specimen is measured as 5 mm/min in accordance with ASTM D638 and ISO 527.

(7) Flexural modulus (kgf/cm$^2$): Flexural modulus is measured as 2.8 mm/min in accordance with ASTM D790 and ISO178.

(8) Dripping: During the flame retardant test, resin dropping is monitored for the specimens having thickness 2.0 mm and 2.5 mm.

As shown in Table 1, (B) and (C) are indicated as parts by weight, based on 100 parts by weight of (A).

TABLE 1

|  | Examples | | | Comparative Examples | | | | | |
| --- | --- | --- | --- | --- | --- | --- | --- | --- | --- |
|  | 1 | 2 | 3 | 1 | 2 | 3 | 4 | 5 | 6 |
| (A) ABS | 100 | 100 | 100 | 100 | 100 | 100 | 100 | 100 | 100 |
| (B) Flame retardant | 4.3 | 4.3 | 4.3 | 4.3 | 4.3 | 4.3 | 4.3 | 4.3 | 4.3 |
| (C-1) CNT | 0.010 | 0.0125 | 0.015 | — | — | 0.010 | — | 1.0 | 0.002 |
| (C-2) CNT | — | — | — | — | — | — | 0.0125 | — | — |
| (D)Teflon | — | — | — | — | 0.3 | 0.3 | — | — | — |
| UL 94 (2.5T) | V-0 | V-0 | V-0 | V-2 | V-0 | V-0 | V-2 | V-2 | V-2 |
| Total combustion time | 6 | 5 | 7 | 48 | 7 | 9 | 127 | 98 | 142 |
| UL 94(2.0T) | V-0 | V-0 | V-0 | V-2 | V-0 | V-1 | V-2 | V-2 | V-2 |
| Total combustion time | 8 | 7 | 6 | 37 | 10 | 51 | 81 | 85 | 142 |
| Vicat softening temperature 50N (5 kg) | 87.4 | 87.3 | 87.5 | 87.7 | 86.1 | 86.5 | 87.4 | 87.5 | 87.6 |
| Heat deflection temp. | 76.2 | 75.2 | 76.2 | 73.7 | 73.6 | 74.2 | 74.6 | 76.8 | 74.2 |
| Impact strength | 21.6 | 20.5 | 21.3 | 19.2 | 18.7 | 19.6 | 20.6 | 20.3 | 20.8 |
| Flexural strength | 650 | 640 | 650 | 640 | 640 | 640 | 630 | 630 | 620 |
| Flexural modulus | 24400 | 23900 | 24200 | 24000 | 23800 | 24200 | 23800 | 24100 | 24400 |
| Dripping | X | X | X | ○ | X | X | ○ | X | ○ |

As shown in Table 1, the thermoplastic resin compositions of Examples 1 to 3 according to the present invention have excellent anti-dripping effect without impairing the mechanical property of the resin.

In Comparative Example 2, dripping did not occur since Teflon is used. However, in Examples 1 to 3, which include a smaller amount of carbon nanotubes than Teflon, dripping did not occur and the mechanical properties of the resin are minimally or not affected.

Comparative Example 1, wherein carbon nanotubes as an anti-dripping agent are not used, exhibits reduced flame retardancy and dripping occurs. Comparative Example 5 wherein carbon nanotubes as an anti-dripping agent is used in excess has mechanical properties of the resin that are similar as those of Examples 1 to 3, but the flame retardancy decreases because fire is not extinguished for a long time due to thermal characteristics of the carbon nanotubes.

In Comparative Example 6, wherein carbon nanotubes are used in an amount less than the present invention, dripping occurred.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A thermoplastic resin composition with anti-dripping properties comprising:
   (A) thermoplastic resin in an amount of about 100 parts by weight;
   (B) flame retardant in an amount of about 1 to about 10 parts by weight; and
   (C) carbon nanotubes in an amount of about 0.005 to about 0.05 parts by weight, wherein the carbon nanotubes have an average diameter of about 3 to about 100 nm and an average length of about 50 to about 500 μm.

2. The thermoplastic resin composition of claim 1, wherein the thermoplastic resin (A) comprises acrylonitrile-butadiene-styrene copolymer resin (ABS resin), rubber modified polystyrene resin (HIPS), acrylonitrile-styrene-acrylate copolymer resin (ASA resin), methylmethacrylate-butadiene-styrene copolymer resin (MBS resin), acrylonitrile-ethylacrylate-styrene copolymer resin (AES resin), polycarbonate resin (PC), polyethylene (PE), polypropylene (PP), polyethylene terephthalate (PET), polybutylene terephthalate (PBT), polyvinylchloride (PVC), polymethyl methacrylate (PMMA), a copolymer thereof, or a combination thereof.

3. The thermoplastic resin composition of claim 1, wherein the flame retardant (B) comprises a halogen compound, phosphorus compound, antimony compound, or a combination thereof.

4. The thermoplastic resin composition of claim 1, wherein the carbon nanotubes (C) are used as an anti-dripping agent.

5. The thermoplastic resin composition of claim 1, wherein the carbon nanotubes (C) include single-walled carbon nanotubes, double-walled carbon nanotubes, multi-walled carbon nanotubes, or a combination thereof.

6. The thermoplastic resin composition of claim 1, wherein the carbon nanotubes have an aspect ratio (L/D) of about 80,000 to about 180,000.

7. The thermoplastic resin composition of claim 1, wherein the thermoplastic resin composition further includes an addictive selected from the group consisting of UV stabilizers, lubricants, releasing agents, nucleating agents, antistatic agents, stabilizers, reinforcing agents, inorganic additives, pigments, dyes, and combinations thereof.

8. A molded article prepared from the thermoplastic resin composition of claim 1.

9. The molded article of claim 8, wherein the molded article has an Izod notch impact strength of about 20 to about 25 kgf·cm/cm, wherein the Izod notch impact strength is measured using a specimen with a ⅛ inch thickness in accordance with ASTM D 256 and ISO 180.

10. The molded article of claim 8, wherein the molded article has a flame retardant rating of V-0 when flame resistance testing is performed in accordance with UL-94,and the molded article has a dripping prevention rating of V-0 when dripping prevention testing is performed in accordance with UL-94.

\* \* \* \* \*